(12) United States Patent
Qian et al.

(10) Patent No.: US 10,448,070 B2
(45) Date of Patent: Oct. 15, 2019

(54) MEDIA DEVICE KNOWLEDGE BASE (71) Applicant: PCCW VUCLIP (SINGAPORE) PTE. LTD., Singapore (SG)

(72) Inventors: Kelly Qian, Fremont, CA (US); Bo Shen, Fremont, CA (US)

(73) Assignee: PCCW Vuclip (Singapore) Pte. Ltd., Singapore (SG)

(*) Notice: Subject to any disclaimer, the term of this patent is extended or adjusted under 35 U.S.C. 154(b) by 0 days.

(21) Appl. No.: 15/225,790

(22) Filed: Aug. 1, 2016

(65) Prior Publication Data
US 2016/0345038 A1 Nov. 24, 2016

Related U.S. Application Data (63) Continuation of application No. 14/626,559, filed on Feb. 19, 2015, now Pat. No. 9,405,813.

(51) Int. Cl.
H04N 21/24 (2011.01)
H04L 29/08 (2006.01)
(Continued)

(52) U.S. Cl.
CPC ....... *H04N 21/2402* (2013.01); *G06F 16/254* (2019.01); *G06F 16/70* (2019.01);
(Continued)

(58) Field of Classification Search
CPC ......... H04N 21/46645; H04N 21/4516; H04N 21/4524; H04N 21/44227; H04N 21/4424; H04N 21/2355; H04N 21/238; H04N 21/24; H04N 21/2402; H04N 21/2407; H04N 21/2343; H04N 21/2387; H04N 21/25825;
(Continued)

(56) References Cited

U.S. PATENT DOCUMENTS 6,035,339 A 3/2000 Agraharam et al.
6,470,378 B1 10/2002 Tracton et al.
(Continued)

OTHER PUBLICATIONS

United States Patent and Trademark Office, U.S. Appl. No. 14/626,559, Non-Final Office Action dated Apr. 28, 2015.
(Continued)

*Primary Examiner* — James R Sheleheda
(74) *Attorney, Agent, or Firm* — EIP US LLP (57) ABSTRACT A media content distribution service identifies a type of media device sending a request to the service over a network and to dynamically adapt content requested by the media device based on the identification. A request sent by a media device may, for example, identify a media content item a user desires to view at the media device, specify a search query for media content items, or otherwise request interaction with the service. According an embodiment, a media content distribution service may use information known about an identified media device type to dynamically adapt media content or other requested resources for display by the media device. By dynamically adapting media content and other resources based on an identified media device type, the media content distribution service may provide access to the services that is compatible with a wide range of media devices having varying device specifications and capabilities.

18 Claims, 6 Drawing Sheets (51) Int. Cl.
*H04N 21/258* (2011.01)
*H04N 21/2662* (2011.01)
*H04N 21/45* (2011.01)
*H04L 12/26* (2006.01)
*H04N 21/2343* (2011.01)
*H04N 21/2387* (2011.01)
*H04N 21/41* (2011.01)
*G06F 16/70* (2019.01)
*G06F 16/25* (2019.01)

(52) U.S. Cl.
CPC .......... *H04L 43/08* (2013.01); *H04L 43/0876* (2013.01); *H04L 67/2828* (2013.01); *H04L 67/303* (2013.01); *H04N 21/2343* (2013.01); *H04N 21/2387* (2013.01); *H04N 21/25825* (2013.01); *H04N 21/25833* (2013.01); *H04N 21/2662* (2013.01); *H04N 21/4126* (2013.01); *H04N 21/4516* (2013.01)

(58) Field of Classification Search
CPC ......... H04N 21/25833; H04N 21/2662; H04N 21/4126; H04L 67/2828; H04L 67/303; H04L 43/08; H04L 43/0876; G06F 16/70; G06F 16/254
See application file for complete search history.

(56) References Cited

U.S. PATENT DOCUMENTS

| | | | |
|---|---|---|---|
| 8,135,860 | B1 | 3/2012 | Brown et al. |
| 8,646,011 | B2 | 2/2014 | Alkove et al. |
| 8,990,869 | B2 | 3/2015 | Hasek |
| 9,166,882 | B1* | 10/2015 | Hill .................. H04L 67/04 |
| 9,405,813 | B1 | 8/2016 | Qian et al. |
| 2003/0009567 | A1 | 1/2003 | Farouk |
| 2003/0177269 | A1 | 9/2003 | Robinson et al. |
| 2007/0124781 | A1 | 5/2007 | Casey et al. |
| 2007/0220575 | A1 | 9/2007 | Cooper et al. |
| 2008/0008188 | A1* | 1/2008 | Buga ............... H04L 41/046 370/395.21 |
| 2008/0183584 | A1 | 7/2008 | Armstrong et al. |
| 2008/0207182 | A1 | 8/2008 | Maharajh et al. |
| 2008/0247312 | A1* | 10/2008 | Gielty ............... H04W 8/22 370/230 |
| 2010/0042683 | A1* | 2/2010 | Fricke ............... H04L 29/06 709/203 |
| 2011/0252082 | A1 | 10/2011 | Cobb et al. |
| 2011/0320592 | A1 | 12/2011 | Kemmerer et al. |
| 2012/0079523 | A1 | 3/2012 | Trimper et al. |
| 2012/0079529 | A1 | 3/2012 | Harris et al. |
| 2012/0079606 | A1 | 5/2012 | Evans et al. |
| 2012/0198020 | A1 | 8/2012 | Parker et al. |
| 2012/0203886 | A1* | 8/2012 | Mavromatis ........ H04L 41/0896 709/224 |
| 2013/0144979 | A1 | 6/2013 | Kansal et al. |
| 2013/0147845 | A1 | 6/2013 | Xie et al. |
| 2015/0038130 | A1 | 2/2015 | Mao et al. |
| 2015/0067472 | A1 | 3/2015 | Chen |
| 2015/0106839 | A1 | 4/2015 | Shrum, Jr. et al. |
| 2015/0127845 | A1* | 5/2015 | Phillips ............... H04L 65/601 709/231 |
| 2015/0150046 | A1* | 5/2015 | Maharajh ............ G06Q 10/10 725/34 |
| 2015/0244721 | A1 | 8/2015 | Spencer et al. |
| 2015/0379605 | A1* | 12/2015 | Phillips ............... G06Q 20/123 705/26.61 |
| 2016/0246860 | A1 | 8/2016 | Qian et al. |
| 2016/0345038 | A1* | 11/2016 | Qian ................... G06F 16/70 |
| 2017/0063922 | A1* | 3/2017 | Ibatullin ............. G06F 21/554 |

OTHER PUBLICATIONS

United States Patent and Trademark Office, U.S. Appl. No. 14/626,559, Non-Final Office Action dated Jul. 15, 2015.
United States Patent and Trademark Office, U.S. Appl. No. 14/626,559, Final Office Action dated Nov. 4, 2015.
United States Patent and Trademark Office, U.S. Appl. No. 14/626,559, Notice of Allowance dated Apr. 1, 2016.
World Intellectual Property Organization, Application No. PCT/US16/18658, International Search Report dated May 31, 2016.
World Intellectual Property Organization, Application No. PCT/US16/18658, Pending Claims as of May 31, 2016.

* cited by examiner

MEDIA DEVICE KNOWLEDGE BASE

PRIORITY CLAIM

This application claims benefit under 35 U.S.C. § 120 as a Continuation of application Ser. No. 14/626,559, filed Feb. 19, 2015. The entire contents of which is hereby incorporated by reference as if fully set forth herein. Applicant hereby rescinds any disclaimer of claim scope in the parent application(s) or the prosecution history thereof and advise the USPTO that the claims in this application may be broader than any claim in the parent application(s).

FIELD OF THE DISCLOSURE

Embodiments relate generally to the distribution of media content. More specifically, embodiments described herein relate to systems and techniques for identifying a type of media device requesting media content from a content distribution system over a network and for dynamically adapting the requested media content based on the identified media device type.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A variety of systems and techniques exist for distributing media content to media playback devices including mobile phones, tablets, laptop or desktop computers, set-top boxes, gaming devices, and many other consumer electronic devices. For example, existing content distribution services often provide interfaces by which a user may browse a media content catalog over a network using various applications at their media playback devices. Users may use the interfaces to select specific items of media content from the catalog, which are then transferred over the network from the content distribution services to the media playback devices.

The popularity of such content distribution services continues to increase, particularly in developing countries. As the popularity of these services has increased, so too has the diversity in the type and capabilities of media devices accessing such services. Media distribution techniques and content formats used by such services often assume that media devices accessing the service are relatively current in performance specifications; however, in many parts of the world, such as in developing countries, access to current generation media devices may be limited and/or prohibitively expensive. These assumptions may result in the content distribution services distributing media content in formats or using techniques that are incompatible with older devices, thereby restricting the ability of many users to utilize the services. Consequently, many existing systems and techniques for distributing media content are deficient in environments where a wide diversity of media device types exists.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
   2.1. Media Devices
   2.2. Media Device Applications
   2.3. Content Distribution Computer System
   2.4 Device Information Identification Computer System
3.0. Functional Overview
   3.1. Processing Media Device Requests
   3.2 Locating a Device Profile Based On User Agent Identification Data
   3.3 Analyzing Unrecognized User Agent Identification Data
   3.4 Detecting Device Profile Mismatches
4.0. Implementation Mechanism—Hardware Overview
5.0. Extensions and Alternatives
6.0. Interpretation of Terms

1.0. General Overview

Approaches, techniques, and mechanisms are disclosed for a media content distribution service to identify a type of media device sending a request to the service over a network and to dynamically adapt content requested by the media device based on the identification. A request sent by a media device may, for example, identify a media content item a user desires to view at the media device, specify a search query for media content items, or otherwise request interaction with the service. According an embodiment, a media content distribution service may use information known about an identified media device type to dynamically adapt media content or other requested resources for display by the media device. By dynamically adapting media content and other resources based on an identified media device type, the media content distribution service may provide access to the services that is compatible with a wide range of media devices having varying device specifications and capabilities.

According to an embodiment, a centralized media device information identification system accessible to the media content distribution service facilitates the identification of requesting media devices. A device information identification system is configured to identify a type of requesting media device by analyzing user agent identification data contained in the request and locating a device profile based on the user agent identification data. In this context, user agent identification data broadly refers to any data included in a request that may be used by the identification system to infer a type of media device sending the request. A device profile associated with a particular type of media device identified generally may include, among other information, specifications of a device's hardware, software, and the device's ability to play particular types and formats of media content. Upon recognition of a type of requesting media device, a device information identification system may provide information included in a corresponding device profile to enable the content distribution system to adapt the requested content accordingly.

In other aspects, the invention encompasses a computer apparatus and a computer-readable medium configured to carry out the foregoing steps.

2.0. Structural Overview

Figure 1:
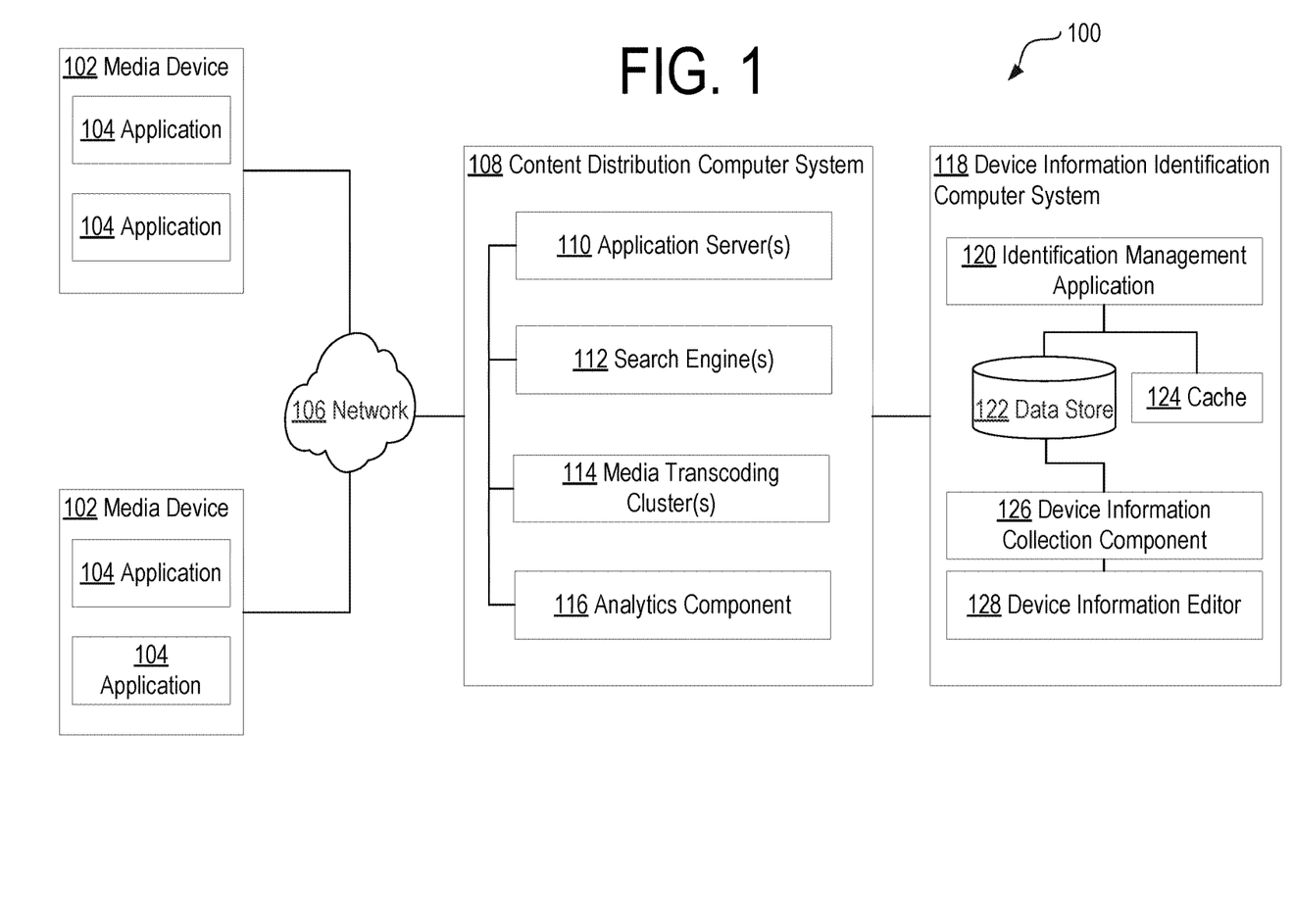
FIG. 1 illustrates a networked computer environment in which an embodiment may be implemented.

FIG. 1 illustrates a networked computer system 100 in which an embodiment may be implemented. FIG. 1 represents one example embodiment that is provided for purposes of illustrating a clear example; other embodiments may use different arrangements.

The networked computer system 100 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Media Devices

The networked computer system 100 includes one or more media devices 102. Media devices 102 of FIG. 1 broadly represent any computing device capable of accessing and receiving media content from a content distribution computer system 108. Types of media devices 102 may include traditional mobile phones, smart phones, tablet computers, other handheld computers, laptop computers, netbook computers, ultrabook computers, portable media players, gaming devices, and so forth. Examples of commercially available media devices 102 include IPHONE, IPAD, or other IOS devices, ANDROID devices, and MICROSOFT WINDOWS devices.

In an embodiment, a plurality of media devices 102 is coupled to a content distribution computer system 108 via one or more networks 106. Network 106 broadly represents one or more LANs, WANs, cellular networks (e.g., LTE, HSPA, 3G, and older technologies), and/or internetworks using any of wired, wireless, terrestrial microwave, or satellite links, and may include the public Internet.

2.2 Media Device Applications

In an embodiment, each media device 102 may host or execute one or more media device applications 104 that are capable of accessing content distribution computer system 108 and/or playing media content items made available by content distribution computer system 108. For instance, a media device application 104 may be or comprise a web browser which a user may use to access a website hosted by content distribution computer system 108. Another example of a media device application 104 may comprise a mobile application or "app." For example, an operator of content distribution computer system 108 may provide a mobile app that is configured to execute on some or all of media devices 102 and enables users to access components of content distribution computer system 108. Other examples of media device applications 104 may include, without limitation, media player applications, embedded software systems such as the APPLE IOS, GOOGLE ANDROID, or any of several other specialized operating systems. The media device applications 104 may be a background process that conducts various activities such as described herein without directly interacting with the user. As yet another example, a media device application 104 may include a "plug-in" or "extension" to another application, such as to a media player or web browser.

2.3. Content Distribution Computer System

In an embodiment, a content distribution computer system 108 includes one or more computers, virtual machine instances, and/or data centers that are configured to host or execute one or more instances of application server(s) 110, search engine(s) 112, media transcoding cluster(s) 114, and analytics component 116. Each of the components of content distribution computer system 108 may be coupled together by one or more networks.

In an embodiment, application server(s) 110 are configured to receive and process requests from media devices 102 relating to media content and other resources made available by an operator of content distribution computer system 108. Depending on the embodiment, media content may include any of a variety of media content items, such as digital video files, digital music files, installable computer game files or other software applications, and so forth. An application server 110 may be configured to communicate directly with web browsers and/or other media device applications 104 on the media devices 102 to provide user interfaces for browsing available media content items and to provide users of the media devices 102 access to media content items.

Each application server 110 may be configured to process requests from one or more particular types of media device applications 104. For example, one application server 110 may comprise a web server that is configured to process requests sent by web browsers and other similar applications operating on media devices 102. Another example application server 110 may comprise a server configured to process requests sent by mobile apps operating on the media devices 102. As described in more detail hereinafter, an application server 110 may process a request received from a media device 102 in coordination with one or more other components of content distribution computer system 108 and/or device information identification computer system 118.

Search engine(s) 112 are configured to receive search requests for media content items and to return search results comprising one or more listings of media content items satisfying a search query. A user of a media device 102 may use a web browser or mobile app to generate a search query for media content items available from content distribution computer system 108, for example, related to "baseball" or "movie trailers." An application server 110 may receive a search request based on the user query and use a search engine 112 to locate media content items satisfying the user's search query. In response to receiving a search request, a media content search engine 112 may return one or more references to media content items satisfying the search query, which an application server 110 may in turn format into search result listings returned to the user's media device 102. In other embodiments, a media device 102 may directly submit search requests and receive results from search engine 112.

Media transcoding clusters 114 are configured to store, retrieve, and process media content that is accessible to users of content distribution computer system 108. In general, a media transcoding cluster 114 may be configured to receive requests from application servers 110 for media content items, to process the requested media content items for playback on a particular type of media device (e.g., by transcoding a media content item to a format usable by the media device, locating a media content item in a format usable by the media device, etc.), and to return the processed media content items to a requesting application server 110 and/or media device 102. In one embodiment, a media transcoding cluster 114 includes or is connected to one or more data repositories (not depicted) storing media content. The data repositories storing the media content may take any of a variety of forms, such as file systems, databases, and so forth. A media transcoding cluster 114 may also be coupled to one or more external services hosting media content and which may be accessible via one or more application programming interfaces (APIs) or other interfaces.

The data repositories of media transcoding clusters 114 may further store metadata, associated with the media content, that describe various aspects of each individual item of media content. Example metadata may include content titles, descriptions, thumbnails, categorical data, digital rights management ("DRM") data such as licensing constraints or decryption keys, rendering information, and so forth. For example, an application server 110 may use some or all of the metadata information to respond to playback requests from media device 102, and a search engine 112 may use some or all of the metadata to locate particular media content items in response to user search requests.

As indicated above, a media transcoding cluster 114 may be configured to process requested media content items based on a type of media device requesting the content. In one embodiment, a media transcoding cluster 114 processing requested media content may include transcoding the content. In general, transcoding media content refers to a process for converting the media content from one from one encoding to another and may involve selection of one or more "codecs" to perform the transcoding. A codec generally refers to a device or computer program that is configured to encode and/or decode the video and/or audio components of the media content into a particular format. Depending on one or more request parameters, a media transcoding cluster 114 may use any of a number of different codecs to encode/decode requested media content into particular formats, each of which may be compatible with one or more types of media devices 102. Examples of requests parameters that may be sent to a media transcoding cluster 114 include a specification of a particular video and/or audio format, a maximum/minimum height and width for video content, an indication of whether a requesting media device is capable of receiving streaming media content, a bit rate for the media content, and so forth. In an embodiment, a media transcoding cluster 114 may select a video codec separately from an audio codec, or the video and audio may be encoded as part of the same codec.

2.4. Device Information Identification Computer System

As described above, a content distribution computer system 108 is configured to receive and process requests from a plurality of media devices 102. According to an embodiment, a content distribution computer system 108 may communicate with a device information identification computer system 118 in order to identify a type of media device sending a request, among other functionality described herein. A device information identification computer system 118 includes one or more computers, virtual machine instances, and/or data centers that are configured to host or execute one or more instances of an identification management application 120, a profile data store 122, a profile cache 124, a device information collection component 126, and device information editor 128.

Identification management application 120 is configured to process requests from a content distribution computer system 108 or other sources related to identifying a type of media device 102. As used herein, a "type" of media device may be defined by any combination of one or more attributes of a media device, including a manufacturer of the device, a device model, hardware and/or software device specifications, and so forth. As one particular example, one type of media device may correspond to a BLACKBERRY CURVE 9315 smart phone; another type of media device may correspond to an APPLE IPAD AIR 2 tablet computer; yet another type of media device may correspond to a NINTENDO 3DS portable gaming device. As described in more detail hereinafter, each type of media device may be associated with a device profile that provides information related to one or more characteristics of the device type.

In one embodiment, an identification management application 120 may comprise a web server that is configured to receive and process requests from other components of system 100, including application servers 110 of a media content distribution computer system 108. For example, an identification management application 120 may comprise a "RESTful" web service that is configured to receive and process such requests. Although FIG. 1 depicts a device information identification computer system 118 in communication with a content distribution computer system 108, the device information identification computer system 118 generally may provide an independent service that is accessible by any other device or system to identify media devices based on user agent strings and to obtain information related to the identified devices. For example, a system that is configured to generate user interface displays may interface with the device information identification computer system 118 to format requested user interface displays based on a particular type of requesting device. As another example, a system that is configured to monitor network security may interface with the device information identification computer system 118 to identify types of devices that are requesting resources from a particular computer network.

As indicated above, each type of media device may be associated with a device profile that includes information about the media device type. For example, each device profile may include information related to a device type's hardware specifications (e.g., a type of processor, storage capacity, whether the device includes a touchscreen or other particular input components, etc.), software specifications (e.g., a default operating system, available user applications, whether the device supports JavaScript, HTML5, or other standards, etc.), and so forth. In one embodiment, device profiles are stored in a data store 122 and/or a profile cache 124, which may include one or more databases, memory and/or disk caches, distributed data stores, flat files, etc. The types of information stored in a device profile for a particular device type may the same across profiles for other device types. For example, some or all device profiles may include information that identifies a manufacturer of the device with which each device profile is associated. Each device profiles may also include one or more types of information is particular to only one or fewer than all of the device profiles stored in a profile cache 124. For example, some types of information (e.g., whether a device supports a particular streaming protocol, codec, etc.) may be relevant only to newer types of devices and thus only those devices may include the information in an associated device profile.

In one embodiment, in addition to information related to a media device type's hardware and software specifications, a device profile may further include information about a media device type's capabilities relating to media content playback. For example, a device profile for a particular media device type may include information indicating video and/or audio formats supported by the device type, a display screen size, playable video dimensions (which may or may be different from the device's display screen size), whether the device type is capable of playing streaming media content, etc.

In an embodiment, information about the performance of various media device types in different geographic regions may be stored as part of the device profiles or separately from the device profiles. For example, one type of media device may support streaming of media content in one geographic region, but may not support streaming media content in another geographic region due to differences in wireless carriers or other geographic-specific device specifications. Other information specific to various geographic regions may be stored for one or more device types, such as types of network technologies supported in the region (e.g., 3G, LTE, or other wireless communication technologies), information about network performance in the region, etc.

Device information collection component 126 is configured to retrieve device information from one or more third-party device information sources, to interface with a device information editor 128, and to store and/or modify the device profile information in a data store 122. In an embodiment, a device information collection component 126 may, for example, be configured to access one or more third-party resources that store media device information and to incorporate the information into the information stored in data store 122. A device information collection component 126 may access the third-party resources on a periodic basis, in response to a user request for information related to particular media device type, in response to a failure of identification management application 120 to identify a requested media device type, or at any other time.

Device information editor 128 may be configured to provide one or more user interfaces that enable a system administrator or other user to add, modify, or remove device profile data stored in a data store 122. For example, a device information editor 128 may provide one or more web or other application interfaces that enable a user to view existing device profiles, to modify information stored in existing device profiles, or to add new device profiles.

For purposes of illustrating a clear example, FIG. 1 shows one or a limited number of each element that has been previously described, and practical embodiments or commercial implementations of the techniques herein may use many instances of various elements. For example, there may be thousands or millions of media devices 102 distributed across many different geographic regions which provide access to a content distribution computer system 108 via many different types of networks 106.

3.0. Functional Overview

The arrangement of FIG. 1 may implement a media content distribution system that includes a media device information identification solution. According to an embodiment, a media content distribution system is configured to receive requests from a plurality of media devices, to identify a type of media device sending each request, and to retrieve a device profile for the identified type of media device from a device information identification computer system. By identifying a type of media device sending each request and retrieving a device profile for the identified media device type, requested media content and other resources may be adapted for each media device type, thereby facilitating access to the media content distribution system across a wide range of media device types.

In various embodiments as further described herein, users of media devices 102 can request media content and other resources using online portals provided by a content distribution computer system 108, accessible using a web browser, mobile app, or other device application. Such online portals generally may enable users to browse available media content and to request playback of particular media content items.

3.1. Processing Media Device Requests

Figure 2:
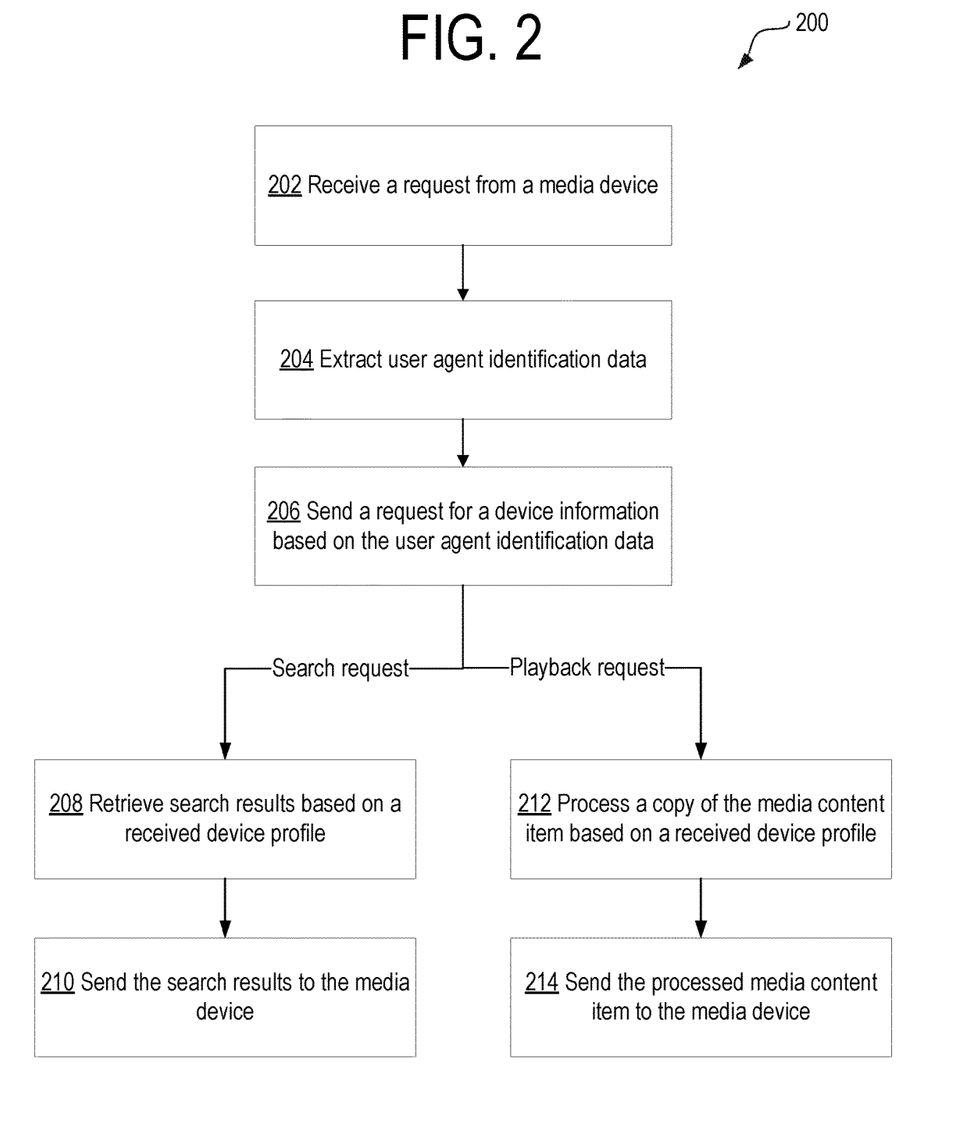
FIG. 2 is a flow diagram that illustrates an example process for a media content distribution system to process requests received from media devices.

FIG. 2 illustrates an example flow 200 for a media content distribution system to process requests received from media devices, according to an embodiment. The various elements of flow 200 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

At block 202, a media content distribution system receives a request from a media device. For example, a media device 102 may send a request to an application server 110 of media content distribution computer system 108 via network 106. The request may be generated by a media device application 104 of a media device 102. If a media device application 104 is a web browser, for example, a user may direct the web browser to a website associated with media content distribution computer system 108 and provide additional input at the website such as a search request for media content items or a selection of one or more particular media content items for playback. As another example, a user may use a mobile app developed by an operator of a content distribution computer system 108 to browse available media content items and to request playback of content items of interest to the user. As yet another example, a media device application 104 may generate and send requests without user involvement, for example, to update a stored listing of available media content items, or for any other purpose.

In an embodiment, sending a request may include a media device application 104 generating one or more messages that are communicated to an application server 110. Each message may include information related to the request such as a type of request, an identification of a requested resource, a time the request was sent, and other information. As one example, if the request is generated by a web browser operating on a media device 102, the messages may conform to the HTTP application protocol and various information may be included in one or more header fields and other portions of the message as defined by the protocol. Messages formatted according to the HTTP application protocol may be processed, for example, by a web server and other types of application servers 110. Mobile apps and other types of media device applications 104 may also generate requests based on the HTTP protocol, or may instead use other types of message protocols.

According to an embodiment, information included in a request generated by a media device application 104 may comprise user agent identification data. In general, user agent identification data may include one or more items of information that serve to identify a media device application 104 and/or a media device 102 hosting the media device application 104, including a type of user agent application, an operating system hosted by the media device, a software vendor and/or version, etc. In an embodiment, user agent identification data may be included in one or more of the messages generated by the media device application 104 and/or any other part of a request. In the example of a request based on the HTTP protocol, user agent identification information typically may be included in an HTTP header field (referred to as the "User-Agent" header field) that is reserved for that purpose.

To illustrate one example of user agent identification data that may be included in a request sent from a media device 102, assume that a user of an IPAD tablet computing device is using an instance of the FIREFOX web browser to request playback of a media content item available from media content distribution computer system 108. For example, the user may direct the web browser to a website hosted by an application server 110 and provide input at the website selecting a media content item for viewing. In response to receiving the user's input selecting the media content item, the web browser software may generate an HTTP request that is sent to an application server 110. Among other information, the request may, for example, include the following user agent identification data in the "User-Agent" header field: "Mozilla/5.0 (iPad; CPU OS 6_0 like Mac OS X) AppleWebKit/536.26 (KHTML, like Gecko) Version/6.0 Mobile/10A5355d Safari/8536.25".

The example user agent identification data illustrated above includes a number of tokens that provide information related to the user agent application (e.g., "Mozilla/5.0" indicating a version of the FIREFOX web browser software), a type of device sending the request (e.g., an "iPad" tablet), among other information. As described in more detail in reference to FIG. 3, all or portions of such a user agent identification data string may be used to identify a type of media device sending a request and to retrieve a corresponding device profile.

While standards exist for properly formatting a user agent string in the HTTP and other application protocols, in general, the developers of each media device application 104 may determine what information that is included in each request. Thus, while one media device application 104 (e.g., a mobile app) may include extensive and detailed user agent identification data in each request, another media device application 104 (e.g., a particular type of web browser) may provide less detailed information. Various techniques for identifying a type of media device when less detailed or otherwise unrecognized user agent identification information is provided is described in reference to FIG. 4.

At block 204, user agent identification data is extracted from the request. For example, an application server 110 receiving a request from a media device 102 may extract the user agent identification data from the request. In general, the location of the user agent identification data may depend on a number of factors, including a type of request received, a type of media device application 104 sending the request, and so forth. Referring again to the example of an HTTP request generated by a web browser, user agent identification data typically may be extracted from one or more header fields (e.g., a "User-Agent" header field) included in the request. Other types of requests may include user agent identification in other parts of the request. Extracting user agent identification request may also include extracting information from the request that is not specifically included in the request for the purpose of identifying a user agent application, such as an IP address and other information that may provide information about a geographic location and/or type of network from which request may have originated.

At block 206, a request is sent for device information based on the extracted user agent identification data. For example, subsequent to an application server 110 extracting the user agent identification data from a request received from a media device 102, the application server 110 may send a request to an identification management application 120 of a device information identification computer system 118 for device information for the requesting media device. The request may include all or a portion of the user agent identification data extracted from the media device request at block 204.

In response to the request and based on the user agent identification data included in the request, an identification management application 120 may locate and return a device profile to the requesting application server 110 or other component. The device profile generally may include information related to an identified type of media device corresponding to the media device 102 from which the request sent to the application server 110 originated. For example, the device profile may include both device identifying information (e.g., a device manufacturer, model name, etc.) and device capability information (e.g., operating system type, screen size, supported media content formats, etc.). Techniques for identifying a type of media device based on user agent identification data and retrieving a corresponding device profile is described in greater detail hereinafter in reference to FIG. 3.

In an embodiment, an application server 110 or other component of a content distribution computer system 108 may use a device profile retrieved for a requesting media device 102 for a number of purposes. For example, if the request received from a media device 102 was a search request for media content items then, in block 208, the application server 110 may retrieve search results for the media device 102 based on the device profile. The application server 110 may use the device profile, for example, to determine particular types and/or formats of media content that are playable by the requesting media device 102, and to request from a search engine 112 media content results that include only media content items playable by the requesting media device 102. At block 210, the application server 110 may further format and send the customized search results to the requesting media device 102.

As another example, if the request received from the media device 102 is a request to playback a particular media content item then, at block 212, the requested media content item may be transcoded and otherwise formatted based on the device profile prior to sending the media content to the media device 102. For example, an application server 110 may retrieve and cause the requested media content item to be formatted in a particular way by sending a request for the media content item to a media transcoding cluster 114.

In an embodiment, a request sent to a media transcoding cluster 114 may identify the requested media content item and include one or more parameters related to options for formatting the requested media content item. An application server 110 may select the parameters based on information included in the retrieved device profile. For example, a particular device profile may include information indicating one or more media content formats playable by a device, a maximum height and width of video content playable at the device, and whether the device is capable of receiving and playing streaming video content, etc. In an embodiment, a media transcoding cluster 114 receiving such a request may in turn use the parameters to retrieve the identified media content item from storage and perform one or more processing steps on the media content item. Example processing steps may include selecting and using one or more codecs to transcode the media content item into a particular video and/or audio format, scaling the media content to particular dimensions, selecting a bit rate and transport protocol for sending the content item, and/or other performing other steps to optimize playback of the media content item by the requesting media device 102.

At block 214, the media content item is sent to the media device for playback. For example, an application server 110 may receive the processed media content from a media transcoding cluster 114 and send the media content item to the requesting media device 102, or a media transcoding cluster 114 may send the media content item directly to the media device 102. A user of the media device 102 may then view the media content at the media device 102 or at a display device connected to media device 102.

3.2. Locating a Device Profile Based on User Agent Identification Data

Figure 3:
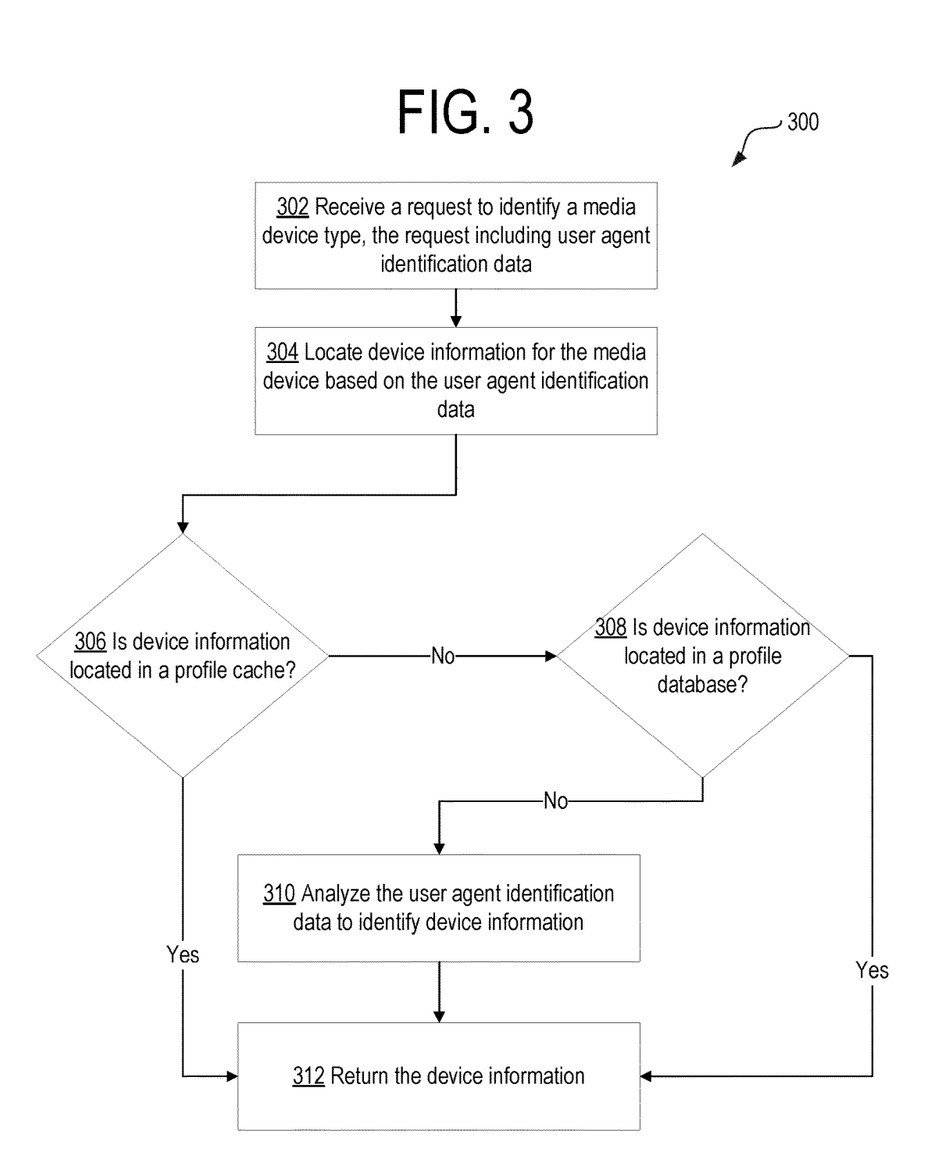
FIG. 3 is a flow diagram that illustrates an example process for determining a device profile for a media device sending a search and/or playback request.

As indicated above, a system 100 may include a device information identification computer system that is configured to receive requests to identify a type of media device and to return a device profile for the identified type of media device. FIG. 3 illustrates an example flow 300 for determining a device profile for a media device sending a request to a content distribution computer system.

At block 302, a request to identify a type of media device is received, the request including user agent identification data. For example, device information identification computer system 118 may receive the request from an application server 110 or other component of content distribution computer system 108. As indicated above, an application server 110 may send the request to the device information identification computer system 118 in response to receiving a request from a media device 102. The user agent identification data included in the request may, for example, correspond to data extracted by an application server 110 from a media device request, as described in reference to block 204 of FIG. 2.

At block 304, based on the user agent identification data included in the request, a device profile is located for the requesting media device. In one embodiment, an identification management application 120 may locate a device profile based on the user agent identification data by using the user agent identification, or one or more portions thereof, as a search key to search one or more profile caches 124 and/or data stores 122. If a device profile cannot be found, further analysis of the user agent identification data may be performed, including analyzing tokens contained the data and/or using other techniques as described in more detail hereinafter in reference to FIG. 4.

Figure 4:
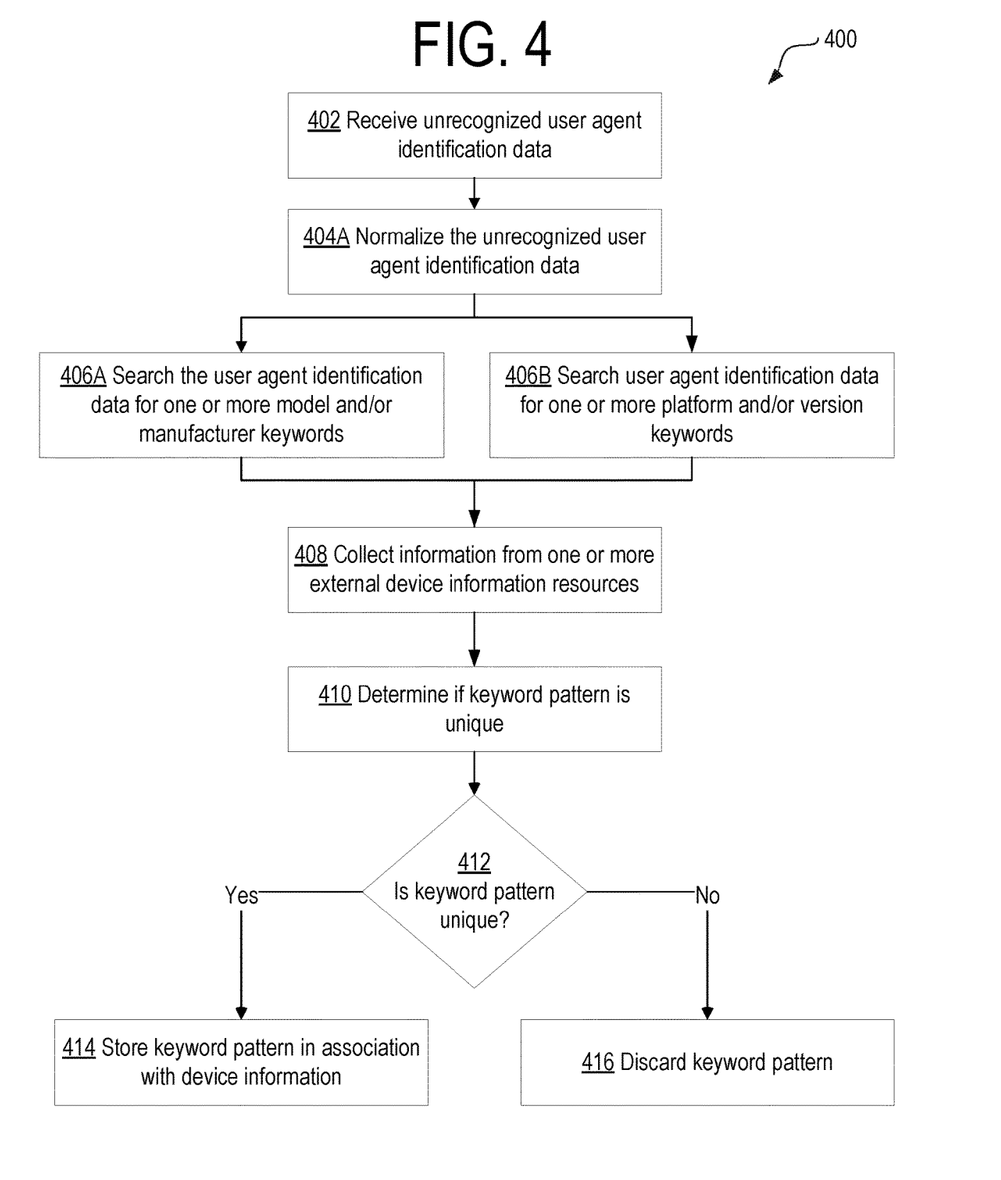
FIG. 4 is a flow diagram that illustrates an example process for analyzing unrecognized user agent identification data to determine an appropriate device profile.

In an embodiment, as part of any of the steps for locating a device profile based on user agent identification data as described in FIG. 3 and FIG. 4, the user agent identification data may be transformed into a format more suitable for processing. For example, if the user agent identification data includes a text string, an identification management application 120 may normalize the text string, convert the text string to a hashed value, or transform the data in any other manner.

At block 306, it is determined whether a device profile corresponding to the user agent identification data is located in a profile cache. For example, an identification management application 120 may use the user agent identification data or portions thereof to search a profile cache 124 for a corresponding device profile. If the user agent identification data includes a text string, for example, all or part of the text string may be used to search one or more mappings between text strings and device profiles stored in the profile cache 124. The mappings may represent, for example, known relationships between user agent identification strings and device profiles based on previous requests received, or based on mapping information received from one or more external sources. If a mapping that includes the user agent identification data is located in the profile cache 124 then, at block 312, a corresponding device profile, or any portion of the device profile, may be returned to the requesting component of a content distribution computer system 108.

In an embodiment, an identification management application 120 may be configured to store recently accessed user agent identification data to device profile mappings in a profile cache 124. By storing recently accessed mappings in a profile cache 124, popular types of media devices 102 that frequently access a content distribution computer system 108 may be readily identified by an identification management application 120.

At block 308, if a device profile for the received user agent identification data is not located in a profile cache, it is determined whether a device profile is located in a profile data store. For example, similar to the process for locating a device profile in a profile cache 124, identification management application 120 may use some or all of the user agent identification data as a search key and/or to generate one or more queries to locate any corresponding mappings between user agent identification data and device profiles stored in a data store 122. In an embodiment, relative to a profile cache 124, a data store 122 may represent a more comprehensive collection of stored user agent identification data to device profile mappings.

If a device profile is located in the data store 122, identification management application 120 may send the device profile, or one or more portions thereof, to the application server 110 or other component of content distribution computer system 108 requesting the device profile. As indicated above, identification management application 120 may also store the recently accessed user agent identification data to device profile mapping in the profile cache 124 in order to improve the response time of subsequent requests based on the same or similar user agent identification data.

If a device profile based on the received user agent identification data is not located in either a profile cache 124 or in data store 122 then, in block 310, the user agent identification data may be further analyzed to identify a device profile, as described in further detail below in reference to FIG. 3. A device profile may not be located in either a profile cache 124 or data store 122, for example, because the media device application 104 sending the original request is an application that has not previously accessed the content distribution computer system 108, or because a previously recognizable media device application 104 has changed the format of the user agent identification included in requests, possibly due to a software upgrade or other change to functioning of the user agent.

In one embodiment, in response to a request to identify a particular media device, a device information identification computer system 118 may return additional information about the operation of a media device 102 based on other aspects of a request. For example, an identification management application 120 may be configured to analyze one or more attributes of a media device 102 request (e.g., an IP address, included GPS information, or other information) and to determine a geographic region from which a media device 102 is sending the request. Based on a geographic region determined for a particular requesting media device 102, an identification management application 120 may modify or supplement information included a device profile to account for regional differences such as network capabilities, device restrictions, and so forth. An application server 110 may use this information, for example, as part of determining how to format media content or other resources returned to the requesting media device 102.

In an embodiment, other attributes of a request such as those described above may also be used to disambiguate user agent identification data that may not uniquely identify a media device type. For example, some media device applications 104 are capable of operating on two or more types of media devices, but may produce user agent identification data that is indistinguishable from one device type to another. Thus, based on the user agent identification data alone, an identification management application 120 may be unable to distinguish whether a request generated by the user agent application originates from one type of media device or another. However, in an embodiment, an identification management application 120 may use certain other request attributes, such as an IP address, to better identify a media device type. For example, one type of media device may be known to send requests through a set of servers having a set or range of known IP addresses which may be used to identify the media device type. As another example, some media device types may be associated with particular geographic regions, and attributes of a request identifying a particular geographic region may be used to identify a device type.

3.3. Analyzing Unrecognized User Agent Identification Data

As indicated above in reference to block 310 of FIG. 3, requests to identify a type of media device may include user agent identification data that is unrecognized by a device information identification system. For example, an identification management application 120 may receive a request including user agent identification data which the application is unable to use to locate a corresponding device profile in either a profile cache 124 or data store 122. User agent identification data may not be recognized, for example, because a media device 102 and/or media device application 104 that created the user agent identification data is sending a request for the first time, because a media device application 104 creating the identification data has been updated or modified, or for any other reason. According to an embodiment, a device information identification system may be configured to parse and analyze unrecognized user agent identification data to determine an existing device profile that may be suitable for the device, or to create a new device profile for the device type.

FIG. 4 illustrates an example flow 400 for analyzing unrecognized user agent identification data, according to an embodiment. The various elements of flow 400 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

At block 402, unrecognized user agent identification data is received. As described above in reference to block 302 of FIG. 3, the user agent identification data may be received as part of a request to identify a type of media device. The identification management application 120 may determine that the user agent identification data is unrecognized based on the system not locating the user agent identification data in one or more profile caches 124 and/or data stores 122.

At block 404, the unrecognized user agent identification data may be normalized. For example, if the user agent identification data includes text data, an identification management application 120 may normalize the text data by removing extraneous mark-up characters, removing extraneous spacing, or modifying other elements in the text data that are not useful for analyzing the data.

At blocks 406A and 406B, the user agent identification data is searched for the presence of one or more keywords. In an embodiment, each of the keywords may be associated with an existing device profile, and the existence of one or more defined keywords in the user agent identification data may indicate that the user agent identification data is associated with the existing device profile. The keywords may also be used as search parameters to search one or more external resources for device information, as described in more detail below.

At block 406A, the user agent identification data is searched for one or more keywords corresponding to device manufacturer and/or model names (e.g., a manufacturer and/or model name of the media device generating the request, etc.). Similarly, at block 406B, the user agent identification data is searched for one or more keywords corresponding to platform and software version information (e.g., a type and version of operating system installed on the device, a type and version of client application generating the request, etc.).

At block 408, if an existing device profile is not located based on the identified keywords, one or more external device information resources may be queried using the identified keywords as search parameters. For example, a device information collection component 126 may be configured to access and collect information from one or more external websites, databases, or other resources that include information about media devices. The collected information may be stored as part of one or more existing device profiles in data store 122, or used to create one or more new device profiles.

In one embodiment, a device information collection component 126 may collect media device identification information from one or more social networking channels. For example, if an identification management application 120 is unable to identify a media device type in, or in order to confirm an identification, a user of a media device 102 may be prompted to complete a survey via a social networking or other website. For example, a device information collection component 126 may cause a URL to be sent to a media device 102 that includes a survey requesting the user to identify a type of the media device 102. In response to receiving the user's input, a mapping is stored.

At block 410, it is determined whether the pattern of keywords identified in the unrecognized user agent identification data is unique relative to the existing profiles stored in profile cache 124 and/or data stores 122. A unique pattern of keywords, for example, ensures that identification management application 120 is able to map future occurrences of the same user agent identification data to the appropriate device profile information. The identification management application 120 may determine if the pattern of keywords is unique by searching existing device profiles in the profile cache 124 and/or data store 122 to determine if any existing user agent identification associated with a device profile uses the same pattern of keywords. At block 412, based on searching the existing device profiles, the uniqueness of the keyword pattern is determined. If it is determined that the pattern of keywords is unique, than at block 414 the pattern is stored in association with the device profile information collected for the particular device. If it is determined that the pattern of keywords is not unique, then at block 416 the pattern may be discarded or modified to create a unique pattern.

3.4. Detecting Device Profile Mismatches

As described above, a media content distribution system may be configured to identify types of media devices accessing the system, and to respond to requests for media content items and other resources by formatting the requested resources based on the identified type of media device. As a result, once the content distribution system is able to correctly identify a particular media device type and provide media devices of that type with compatible content, network traffic for the particular media device type is expected to increase or remain relatively stable. However, situations may arise where a device profile provides incorrect information for a particular type of media device, for example, because the device profile contains incorrect information about the device or because the type of media device is mapped to the wrong device profile. In such situations, users of the particular media device type may be unable to access media content and other service resources, for example, because the content is sent in a format that is not capable of playback or rendering on the devices, and network traffic from the media devices may suddenly decrease.

In order to address these and other issues, a media content distribution system may be configured to monitor media device interactions with the system and to perform one or more corrective actions in response to detecting a significant decrease in network traffic from one or more particular media device types. According to one embodiment, network traffic information and other usage data for each type of media device requesting content may be collected and analyzed to detect anomalies in traffic which may in turn be used to identify possible device profile mismatches for correction.

Figure 5:
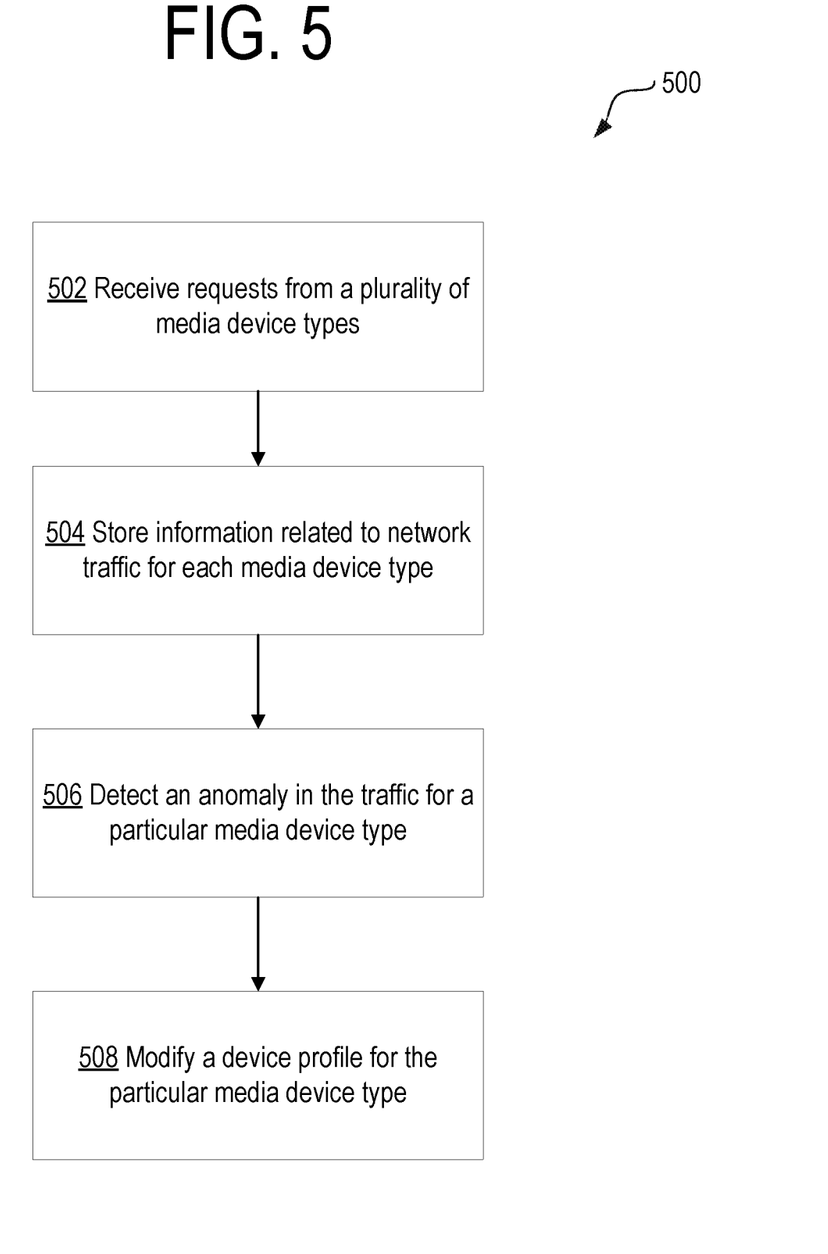
FIG. 5 is a flow diagram that illustrates an example process for analyzing usage statistics to identify possible device profile mismatches.

FIG. 5 illustrates an example flow 500 for analyzing usage data, according to an embodiment. The various elements of flow 500 may be performed in a variety of systems, including systems such as system 100 described above in reference to FIG. 1. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

At block 502, requests for media content items and/or other resources are received from a plurality of media device types. For example, one or more application servers 110 of a content distribution computer system 108 may receive requests from a plurality of media devices 102, including media devices of different types. The requests may include requests to view one or more webpages, search requests for media content items, requests to playback particular media content items, or any other type of requests.

At block 504, information related to network traffic for each media device type is collected and stored. In this context, network traffic refers to any aspect of communication between media devices 102 and a content distribution computer system 108 via networks 106. For example, the network traffic information collected may include a number of requests for webpages hosted by one or more application server 110, information about requests for media content items, information about a duration with which users of media devices 102 view particular webpages and/or media content items, network latency information, etc.

At block 506, an anomaly in the network traffic pattern for a particular media device type is detected. For example, an analytics component 116 of a content distribution computer system 108 may continuously or periodically analyze the network traffic data collected for a plurality of media device types to detect significant changes in the amount of network traffic received from particular types of media devices 102. A significant decrease in an amount of network traffic detected for a particular type of media device 102 may, for example, indicate that the particular type of media device 102 is experiencing technical issues viewing media content or other resources received from the content distribution computer system 108. In an embodiment, a significant decrease in network traffic may be measured in relation to a configurable threshold value, for example, a certain percentage decrease in network traffic, or a total volume decrease amount.

In one embodiment, detecting an anomaly in the network traffic pattern for a particular media device type may include detecting a disparity between a number of requests for webpages and a number of requests to view media content items. Such a disparity may indicate, for example, that users of the type of media device are able to access and view the content provider's website, but may be experiencing difficulty playing back the media content items on the users' devices. The difficulty playing back the media content items, for example, may be a result of incorrect information in a device profile about media content formats that are playable on that particular type of media device, or other user agent identification to device profile mapping issues.

At block 508, in response to detecting an anomaly in the network traffic pattern for a particular type of media device, one or more modifications may be made to a device profile associated with the particular media device type. As indicated above, a significant decrease in a particular media device type's traffic patterns may indicate an inability of the media device type to playback video on the devices or otherwise access the media content distribution system. Thus, one or more modifications may be made to a device profile associated with the media device type in order to correct any compatibility issues.

In one embodiment, modifying a device profile in response to detecting a network traffic pattern anomaly may include generating an alert message or other indication to an administrator or other user that a possible device profile issue exists. For example, an alert message may be presented in a device information editor 128, and the device information editor 128 may further provide one or more interfaces that enable a user to modify one or more attributes of a device profile in an attempt to correct issues the particular media device type may be experiencing. For example, a user may modify information in a particular device profile related to supported media content formats, streaming capabilities, and/or other attributes based on the user's estimation of the device type's actual capabilities. As another example, a user may modify an association between one or more particular user agent identification data elements and device profiles so that future requests including the particular data elements are associated with a different device profile.

In one embodiment, in response to detecting a network traffic pattern anomaly for a particular media device type, a device information editor 128, analytics component 116, or other component of system 100 may automatically modify a device profile for the media device type. For example, in one embodiment, an analytics component 116 may comprise an expert system that is configured to modify one or more device profiles in response to detecting network traffic anomalies. After a modification to a device profile is made, an analytics component 116 may continue to collect and analyze network traffic patterns to determine whether the modifications were successful in stabilizing network traffic patterns for the particular media device type. If the network traffic patterns for the media device type do not improve, another modification to the device profile may be made, and so forth until an improvement is detected. In this manner, an analytics component 116 may use a feedback loop to self-correct any issues that may arise from a misidentification of a media device type or other issues with one or more device profiles.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

4.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
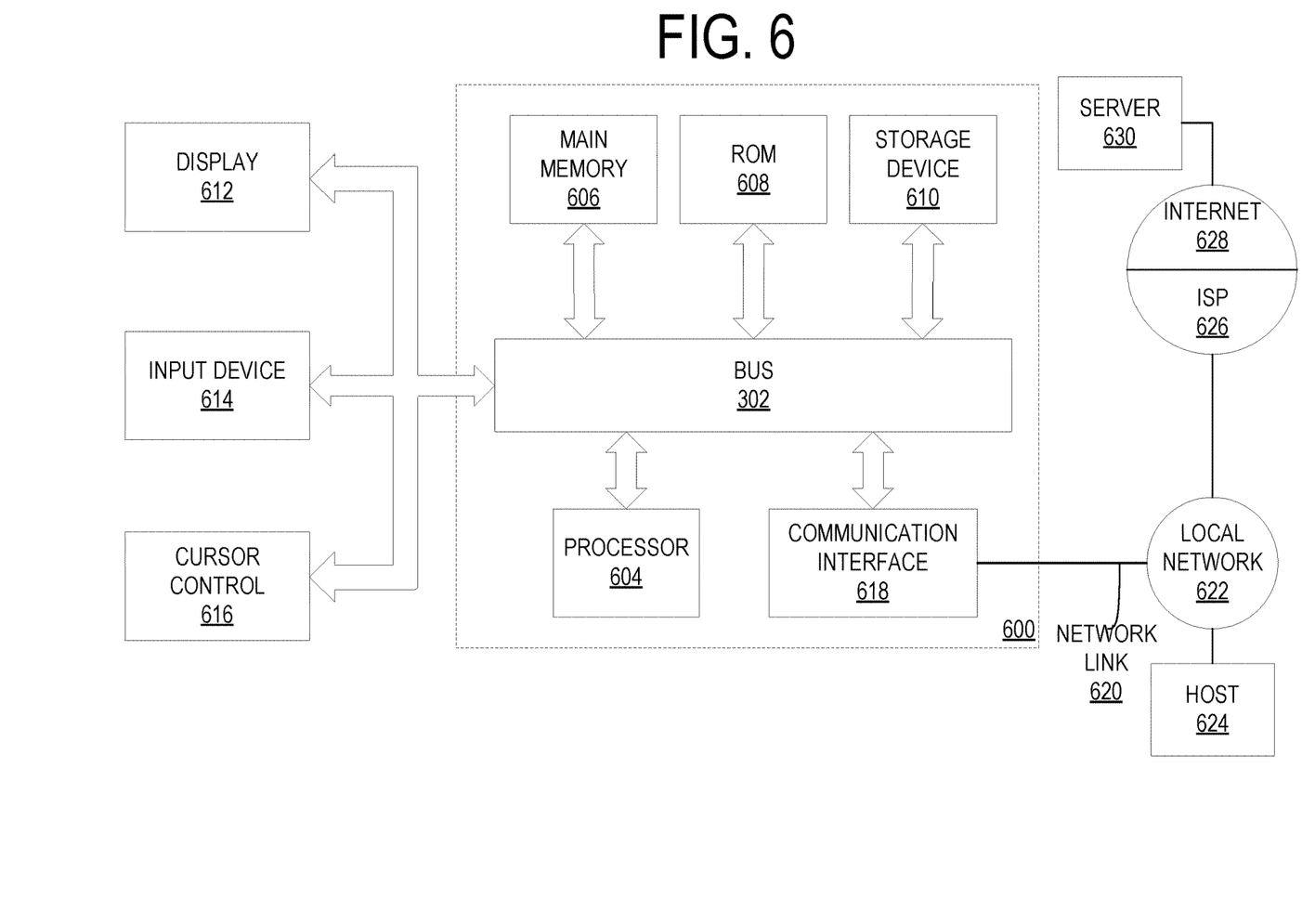
FIG. 6 is block diagram of a computer system upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In an embodiment, some or all of the systems described herein may be or comprise server computer systems, including one or more server computer devices that collectively implement various components of the system as a set of server-side processes. The server computer systems may include web server, application server, database server, and/or other conventional server components that the depicted components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third third-party entities, on behalf of another entity for whom the components are deployed. In other embodiments, however, the described systems may be implemented entirely by computer systems owned and operated by a single entity.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

6.0. Interpretation of Terms

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

In the appended claims, any clause, element or limitation of a claim that does not include the words "means for" is not intended to invoke or to be construed under 35 U.S.C. §

112(f). In the appended claims, any clause, element or limitation that is expressed as a thing for performing or configured to perform a specified function without the recital of structure, material or acts in support thereof is intended to be construed to cover the corresponding structure, material or acts described in the specification, and any other structure, material or acts that were known or in use as of the priority date to which this patent document is entitled or reasonably foreseeable to those of ordinary skill in the art in view of the disclosure as a whole herein, and equivalents thereof.

What is claimed is:

1. A method comprising:
    monitoring network traffic between a plurality of media devices and one or more content distribution servers;
    detecting a decrease in network traffic patterns associated with media devices among the plurality of media devices having a particular media device type, the network traffic patterns are related to requests for media content provided by the one or more content distribution servers, wherein the decrease in network traffic patterns includes a decrease in a number of requests to view media content provided by the one or more content distribution servers when compared to a number of requests for webpages;
    in response to detecting the decrease in network traffic patterns, determining one or more corrective compatibility modifications to a device profile associated with the particular media device type in order to correct compatibility issues associated with the particular media device type;
    updating the device profile with the determined one or more corrective compatibility modifications;
    wherein the device profile including the one or more corrective compatibility modifications is used by the one or more content distribution servers to provide media content to media devices of the particular media device type;
    wherein the method is performed by one or more computing devices.

2. The method of claim 1, wherein the media content is video content, and wherein the device profile includes one or more device attributes related to video playback.

3. The method of claim 1, wherein the device profile is stored in a device profile data store.

4. The method of claim 1, further comprising:
    further monitoring network traffic between the media devices of the particular media device type and the one or more content distribution servers to determine whether the determined one or more corrective compatibility modifications were successful in stabilizing network traffic patterns;
    detecting that subsequent network traffic patterns associated with the media devices among the plurality of media devices having the particular media device type have not returned to previously observed levels;
    in response to detecting that the subsequent network traffic patterns have not returned to previously observed levels, determining one or more second corrective compatibility modifications to the device profile;
    updating the device profile with the determined one or more second corrective compatibility modifications.

5. The method of claim 1, wherein the device profile includes content format information that includes one or more of: selecting one or more codecs for transcoding the media content, formatting one or more images associated with the media content, or selecting a subtitle language.

6. The method of claim 1, wherein the device profile includes device information collected from one or more external device information resources.

7. The method of claim 1, wherein the device profile includes information related to two or more geographic regions where media devices having the particular media device type have been monitored.

8. The method of claim 1, wherein the determined one or more modifications are adjusted to account for regional differences.

9. The method of claim 1, further comprising: generating an alert message upon detecting the decrease in network traffic patterns.

10. One or more non-transitory computer-readable media storing instructions that, when executed by one or more computing devices, cause performance of:
    monitoring network traffic between a plurality of media devices and one or more content distribution servers;
    detecting a decrease in network traffic patterns associated with media devices among the plurality of media devices having a particular media device type, the network traffic patterns are related to requests for media content provided by the one or more content distribution servers, wherein the decrease in network traffic patterns includes a decrease in a number of requests to view media content provided by the one or more content distribution servers when compared to a number of requests for webpages;
    in response to detecting the decrease in network traffic patterns, determining one or more corrective compatibility modifications to a device profile associated with the particular media device type in order to correct compatibility issues associated with the particular media device type;
    updating the device profile with the determined one or more corrective compatibility modifications;
    wherein the device profile including the one or more corrective compatibility modifications is used by the one or more content distribution servers to provide media content to media devices of the particular media device type.

11. The one or more non-transitory computer-readable media of claim 10, wherein the media content is video content, and wherein the device profile includes one or more device attributes related to video playback.

12. The one or more non-transitory computer-readable media of claim 10, wherein the device profile is stored in a device profile data store.

13. The one or more non-transitory computer-readable media of claim 10, wherein the instructions that, when executed by one or more computing devices, cause further performance of:
    further monitoring network traffic between the media devices of the particular media device type and the one or more content distribution servers to determine whether the determined one or more corrective compatibility modifications were successful in stabilizing network traffic patterns;
    detecting that subsequent network traffic patterns associated with the media devices among the plurality of media devices having the particular media device type have not returned to previously observed levels;
    in response to detecting that the subsequent network traffic patterns have not returned to previously observed levels, determining one or more second corrective compatibility modifications to the device profile;

updating the device profile with the determined one or more second corrective compatibility modifications.

14. The one or more non-transitory computer-readable media of claim 10, wherein the device profile includes content format information that includes one or more of: selecting one or more codecs for transcoding the media content, formatting one or more images associated with the media content, or selecting a subtitle language.

15. The one or more non-transitory computer-readable media of claim 10, wherein the device profile includes device information collected from one or more external device information resources.

16. The one or more non-transitory computer-readable media of claim 10, wherein the device profile includes information related to two or more geographic regions where media devices having the particular media device type have been monitored.

17. The one or more non-transitory computer-readable media of claim 10, wherein the determined one or more modifications are adjusted to account for regional differences.

18. The one or more non-transitory computer-readable media of claim 10, wherein the instructions that, when executed by one or more computing devices, cause further performance of:

generating an alert message upon detecting the decrease in network traffic patterns.

* * * * *